(12) United States Patent
Lundstrom (10) Patent No.: US 8,123,016 B2
(45) Date of Patent: Feb. 28, 2012

(54) HYDRAULIC ACTUATOR

(75) Inventor: Bo Lundstrom, Glumslov (SE)

(73) Assignee: BorgWarner TorqTransfer Systems AB (SE)

( * ) Notice: Subject to any disclaimer, the term of this patent is extended or adjusted under 35 U.S.C. 154(b) by 0 days.

(21) Appl. No.: 13/021,316

(22) Filed: Feb. 4, 2011

(65) Prior Publication Data

US 2011/0192695 A1    Aug. 11, 2011

Related U.S. Application Data

(63) Continuation of application No. PCT/SE2009/050883, filed on Jul. 9, 2009.

(30) Foreign Application Priority Data

Aug. 14, 2008  (SE) ...................................... 0801794

(51) Int. Cl.
*F16D 48/06* (2006.01)
*B60K 23/08* (2006.01)

(52) U.S. Cl. ................................. 192/85.63; 192/103 FA
(58) Field of Classification Search ............. 192/103 FA
See application file for complete search history.

(56) References Cited

U.S. PATENT DOCUMENTS 3,748,928 A * 7/1973 Shiber .............................. 475/88
4,084,601 A * 4/1978 Rowen .............................. 137/49

FOREIGN PATENT DOCUMENTS

| EP | 1256478 A2 | 11/2002 |
|---|---|---|
| EP | 1795391 A1 | 6/2007 |
| EP | 1830096 A2 | 9/2007 |
| GB | 2278674 A | 12/1994 |
| JP | 5104974 A | 4/1993 |

OTHER PUBLICATIONS

International Search Report; PCT/SE2009/050883; Oct. 29, 2009; 4 pages.

* cited by examiner

*Primary Examiner* — Richard M. Lorence
(74) *Attorney, Agent, or Firm* — St. Onge Steward Johnston & Reens LLC (57) ABSTRACT

A pump coupling or hydraulic actuator controlling one or more limited slip couplings of a distribution system for distribution torque between front and rear axles in all wheel drive vehicles and/or distribution of torque between left and right wheels in two or four wheel drive vehicles. The hydraulic actuator includes an electric motor, a hydraulic pump, driven by a drive shaft of the electric motor, and the one or more limited slip couplings. Each limited slip coupling includes a disc package and a piston acting on the disc package, which piston is actuated by a hydraulic pump. A centrifugal regulator is connected to a rotating part of the electric motor or the hydraulic pump, which centrifugal regulator controls a pressure overflow valve, connected to the oil outlet of the hydraulic pump. The pressure is controlled by current to the electric motor or by control of the motor speed.

13 Claims, 8 Drawing Sheets

HYDRAULIC ACTUATOR

CROSS-REFERENCE TO RELATED APPLICATIONS

The present application is a continuation of pending International patent application PCT/SE2009/050883 filed on Jul. 9, 2009 which designates the United States and claims priority from Swedish patent application 0801794-9 filed on Aug. 14, 2008, the content of which is incorporated herein by reference.

FIELD OF THE INVENTION

The invention relates to a distribution system for distribution torque between front and rear axles in all wheel drive vehicles and/or distribution of torque between left and right wheels in two or four wheel drive vehicles. The invention refers more precisely to a pump coupling or hydraulic actuator controlling one or more limited slip couplings of a distribution system.

BACKGROUND OF THE INVENTION

In all wheel drive vehicles there is often a multiple disc clutch that is actuated for distribution of torque between front and rear axles. Such a multiple disc clutch may also be used in distribution of torque between left and right wheels. The multiple disc clutches are often actuated by some kind of hydraulic actuation. In EP 1 256 478 one example of such a hydraulic actuation is shown. It has a hydraulic pump, acting in opposite directions of speed, an oil pressure sensor, two bypass orifice valves, a non-return valve, a relief valve and a quick open valve.

There is a constant strive to reduce costs. This is often done by simplifying existing system and it could also be done by reducing the space needed for a specific system. Less space occupied will simplify adapting the system to different vehicles.

Thus, one object of the present invention is to reduce the number of the hydraulic components (no bypass orifice valves) for a robust design, more compact installation, lower weight and lower productions costs. Furthermore, in the present invention no pressure sensor is needed. A further general object is to arrange a simple but yet reliable actuation system for a multiple disc clutch in a torque distribution system for example for all wheel drive vehicles. Another object is that the actuation system should react promptly on regulation signals.

SUMMARY OF THE INVENTION

According to the invention this is achieved in a torque distribution system having a hydraulic actuator comprising an electric motor, a hydraulic pump and a limited slip coupling. The hydraulic pump is driven by means of a drive shaft of the electric motor. The limited slip coupling comprises a disc package and a piston acting on the disc package. The piston is actuated by means of the hydraulic pump. Furthermore, a centrifugal regulator is connected to a rotating part of the electric motor or the hydraulic pump. The rotating part is often the drive shaft of the electric motor. The centrifugal regulator controls a pressure overflow valve connected to an oil outlet of the hydraulic pump. A relief valve is connected to a cylinder chamber encompassing the piston of the limited slip coupling.

Further objects and advantages of the present invention will be obvious to a person skilled in the art reading the detailed description below of embodiments of the present invention.

BRIEF DESCRIPTION OF THE DRAWINGS

The invention will be described by way of examples below and with reference to the enclosed drawings. In the drawings

DETAILED DESCRIPTION OF THE INVENTION

In FIGS. 1-5 five general examples of different drive systems for vehicles are shown. In all examples the vehicle is driven by means of an engine 1 and a transmission 2. The vehicle of all examples also has a front axle 3, a rear axle 5, one or more differentials 6 and one or more limited slip couplings 7. The limited slip coupling 7 may be used in a device for distribution of torque between front and rear axles 3, 5 of an all wheel drive vehicle and/or distribution of torque between left and right wheels of a two or four wheel drive vehicle. The limited slip coupling 7 comprises a disc package 15 actuated by means of a piston 13 received in a cylinder chamber 14. When the piston 13 is actuated the discs of the disc package 15 will go into contact with each other.

Figure 1:
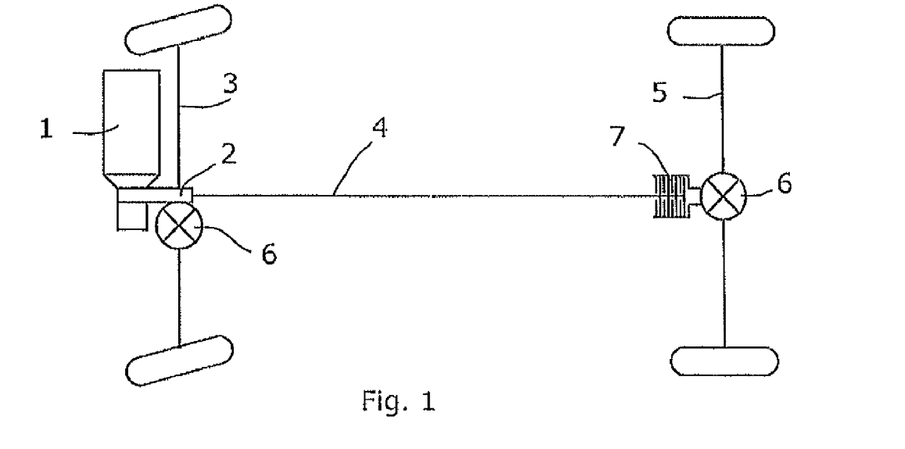
FIGS. 1-5 show examples of different drive systems for vehicles according to the prior art, where the present invention may be used.
Figure 2:
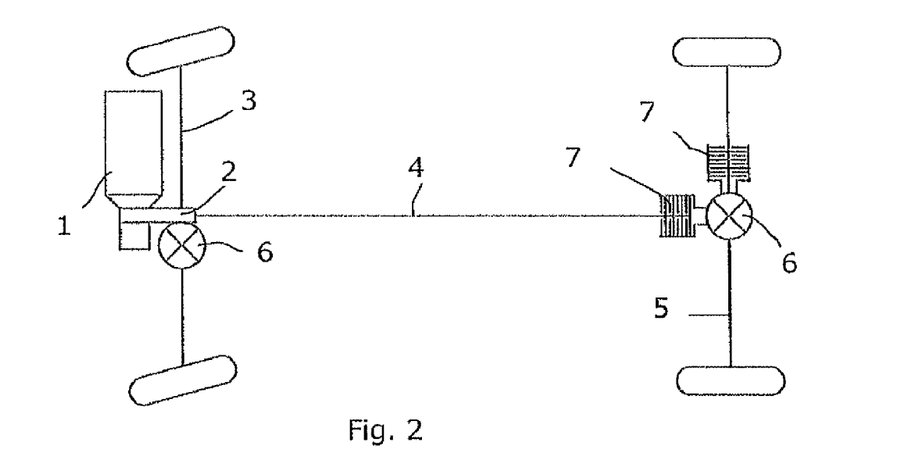
Figure 3:
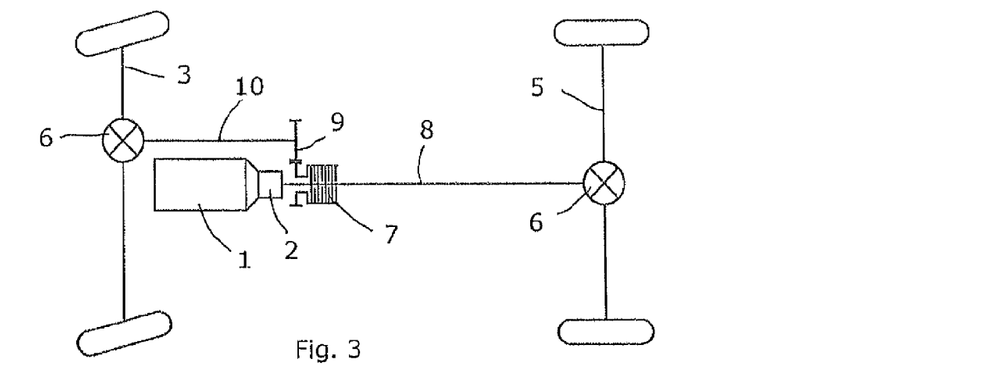
Figure 4:
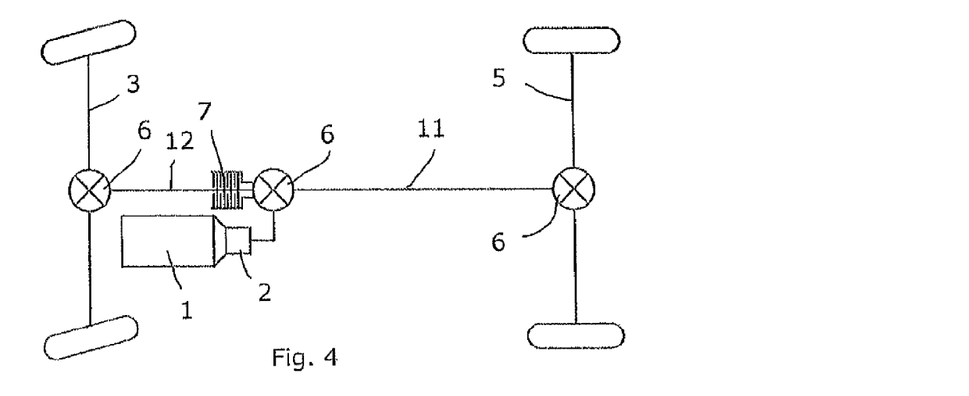

The examples of FIGS. 1 and 2 show common four wheel drives, where the four wheel drive of FIG. 2 has a distribution of torque between the rear wheels. The example of FIG. 3 is generally a rear wheel drive with the possibility to also drive the front wheels. In FIG. 4 one example having a central differential is shown. Finally, in FIG. 5 one example of a front wheel drive is shown having a distribution of torque between the front wheels. A person skilled in the art realises that there are further examples of drive systems where the present invention may be used.

In the example of FIG. 1 an intermediate axle 4 is connected between the front axle 3 and the rear axle 5. A limited slip coupling 7 is placed between the intermediate axle 4 and a differential 6 of the rear axle 5. The example of FIG. 2 differs from the example of FIG. 1 only in that a further limited slip coupling 7 is placed on the rear axle 5.

In the example of FIG. 3 a limited slip coupling 7 is placed between the transmission 2 of the engine 1 and an intermediate axle 8, the other end of which intermediate axle 8 is connected to a differential 6 of the rear axle 5. A transmission 9 is placed between the limited slip coupling 7 and a further intermediate axle 10, the other end of which intermediate axle 10 is connected to a differential 6 of the front axle 3.

In the example of FIG. 4 the transmission 2 of the engine 1 is connected to a differential 6, which differential is connected to a first intermediate axle 11 and a second intermediate axle 12. A limited slip coupling 7 connects the differential 6 with the second intermediate axle 12. The other end of the first intermediate axle 11 is connected to a differential 6 of the rear axle 5. One end of the second intermediate axle 12 is connected to a differential 6 of the front axle 3.

Figure 5:
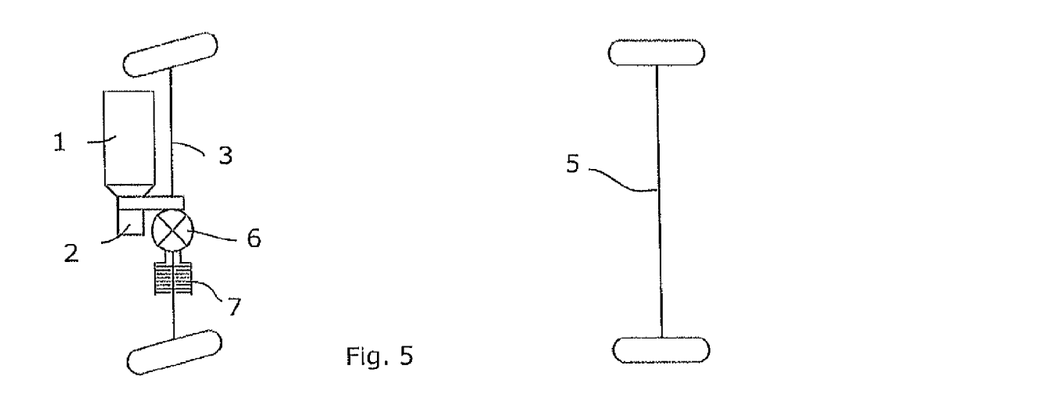

In the example of FIG. 5 a differential 6 is connected to the front axle 3. The differential 6 is connected to two axle halves forming the front axle 3. A limited slip coupling 7 is arranged to connect the differential 6 with one of the axle halves of the front axle 3. In this example the rear axle 5 is not driven.

Figure 6:
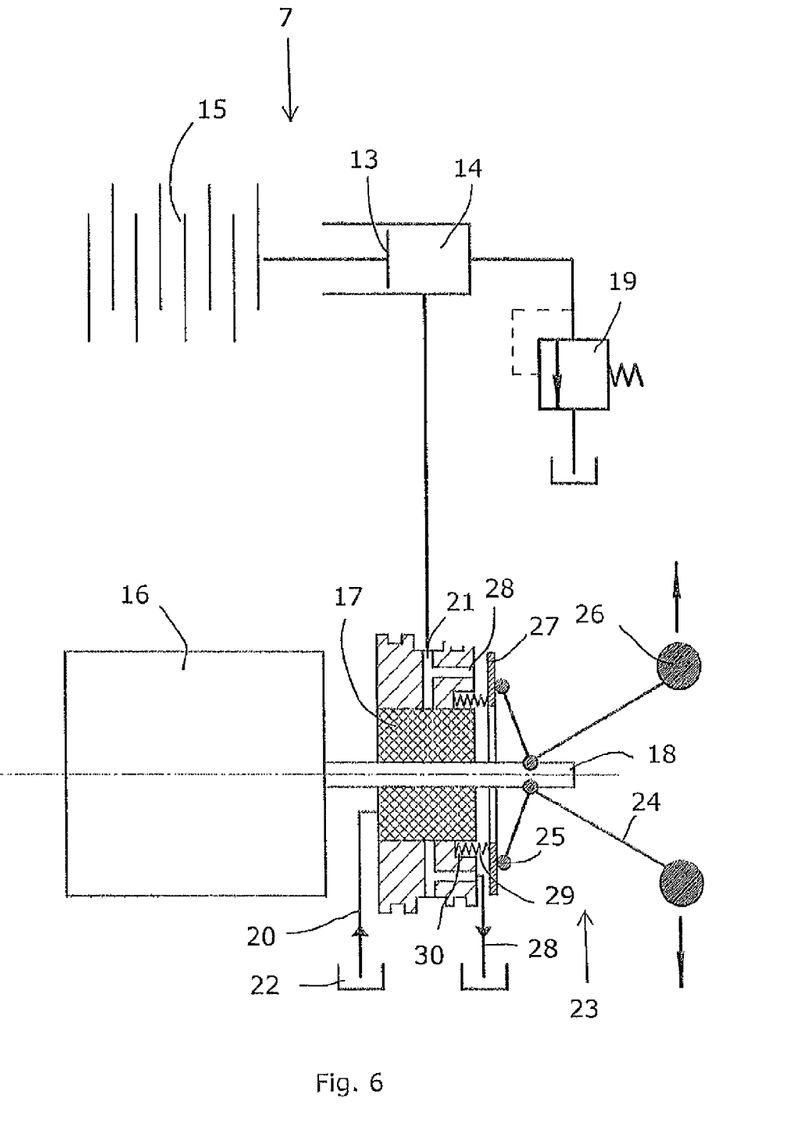
FIG. 6 is one example of a hydraulic actuator according to the present invention.

The piston 13 of the limited slip coupling 7 shown in FIG. 6 is actuated by means of a hydraulic pump 17 of a hydraulic actuator system. In addition to the limited slip coupling 7 and the hydraulic pump 17, the hydraulic actuator system also comprises an electric motor 16, a relief valve 19 and a pressure overflow valve controlled by a centrifugal regulator 23.

The electric motor 16 is normally a brush DC motor. A drive shaft 18 of the electric motor 16 is connected to and drives the hydraulic pump 17. The hydraulic pump 17 may be any kind of pump, such as a gear pump, a van pump, a radial piston pump or an axial piston pump. A centrifugal regulator 23 is integrated with the hydraulic pump 17 and controls the pressure overflow valve. Also the centrifugal regulator 23 is connected to and is driven by the drive shaft 18 of the electric motor 16. In other embodiments the centrifugal regulator 23 is connected to a rotating part of the hydraulic pump 17 instead of the drive shaft 18 of the electric motor 16.

The hydraulic pump 17 has an oil inlet 20 and an oil outlet 21. The oil outlet 21 is connected to the cylinder chamber 14 encompassing the piston 13. The relief valve 19 is also connected to said cylinder chamber 14 encompassing the piston 13. Both the oil outlet 21 of the hydraulic pump 17 and the relief valve 19 are connected to the same side of the piston 13. Furthermore, an overflow outlet 28 of a pressure overflow valve is connected to the oil outlet 21 of the hydraulic pump 17.

One further function of the pressure overflow valve is to have a leakage in the system so that the electric motor 16 will run constantly (not burn brushes in a not running DC motor). The electric motor 16 will have a very short reaction time to build up pressure in the system as the electric motor 16 already is running, and, thus, less energy will be spent for accelerating rotating parts.

The pressure overflow valve has a washer 27 closing off an overflow outlet 28 of the hydraulic pump 17. One or more springs 29 are acting on one side of the washer 27 to lift the washer from the overflow outlet 28. The one or more springs 29 are placed in one or more recesses 30 of the hydraulic pump 17. The centrifugal regulator 23 is acting on the opposite side of the washer 27 to press the washer 27 against the overflow outlet 28. The force of the centrifugal regulator 23 acting on the washer 27 depends on the rotational speed of the centrifugal regulator 23, or put in other words, the rotational speed of the drive shaft 18 of the electric motor 16 or a rotating part of the hydraulic pump 7, whichever the centrifugal regulator 23 is connected to. The higher rotational speed the higher the force generated by the centrifugal regulator 23.

The washer 27 of the pressure overflow valve may be supported in several different ways. In one embodiment an axial bearing supports the washer 27 and in another embodiment the washer 27 is a glide washer gliding on an oil film.

Figure 8:
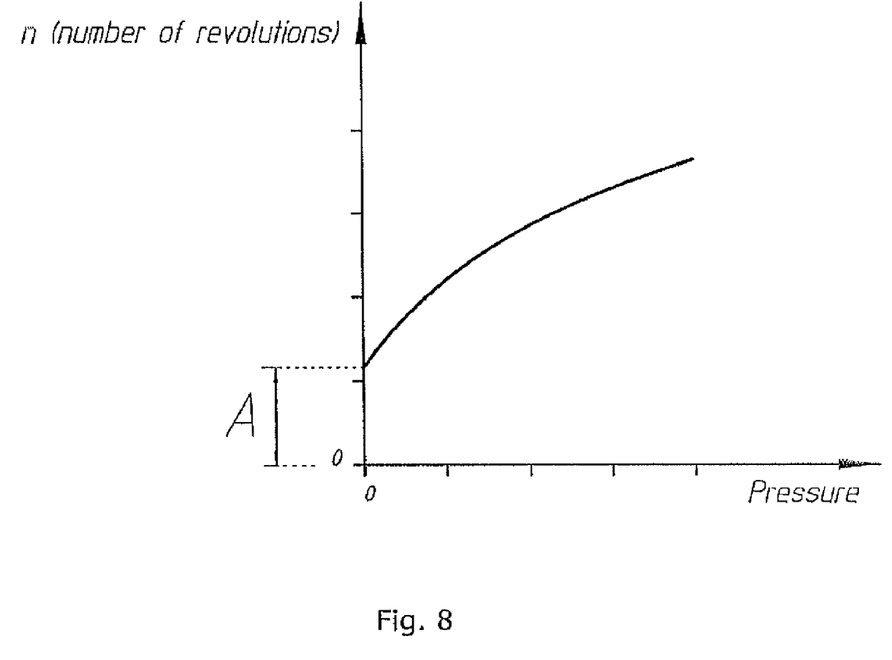
FIG. 8 is a diagram illustrating the relation between rotational speed of a shaft and a hydraulic pressure of the hydraulic actuator of FIGS. 6 and 7.

The integrated centrifugal regulator 23 regulates the pressure at the oil outlet 21 of the pump 17. In the embodiment of FIG. 6 the centrifugal regulator 23 is schematically shown having the form of centrifugal levers 24. The centrifugal levers 24 are angular with a general L-form. The centrifugal levers 24 are connected to the drive shaft 18 of the electrical motor 16, in such a way that the centrifugal levers 24 will rotate with the drive shaft 18 at the same time as the centrifugal levers 24 may turn axially in relation to the drive shaft 18 at the apex of the angular centrifugal levers 24. At one end the centrifugal levers 24 are placed in contact with the washer 27, as indicated with the reference sign 25 in FIG. 6. At the other end of the centrifugal levers 24 a weight 26 is placed. Furthermore, the part of each centrifugal lever 24 going from the apex, i.e. at the drive shaft, to the weight 26 is longer than the part of each centrifugal lever 24 going from the apex to the washer 27. In some embodiments the weight of the longer part is sufficiently higher than the weight of the other part to possibly delete the weights at the end. If the rotational speed of the drive shaft 18 increases the centrifugal levers 24 will rotate around the apex in such a way that the weights 26 will have a tendency to move away from the drive shaft 18, pressing the centrifugal levers 24 against the washer 27. Such a movement of the centrifugal levers 24 will close the pressure overflow valve. Closing of the pressure overflow valve will affect the pressure level in the chamber 14 of the piston 13 of the limited slip coupling 7. As indicated in FIG. 8 the rotational speed n of the drive shaft 18 must reach a certain level before the hydraulic pressure starts to build up.

Figure 7:
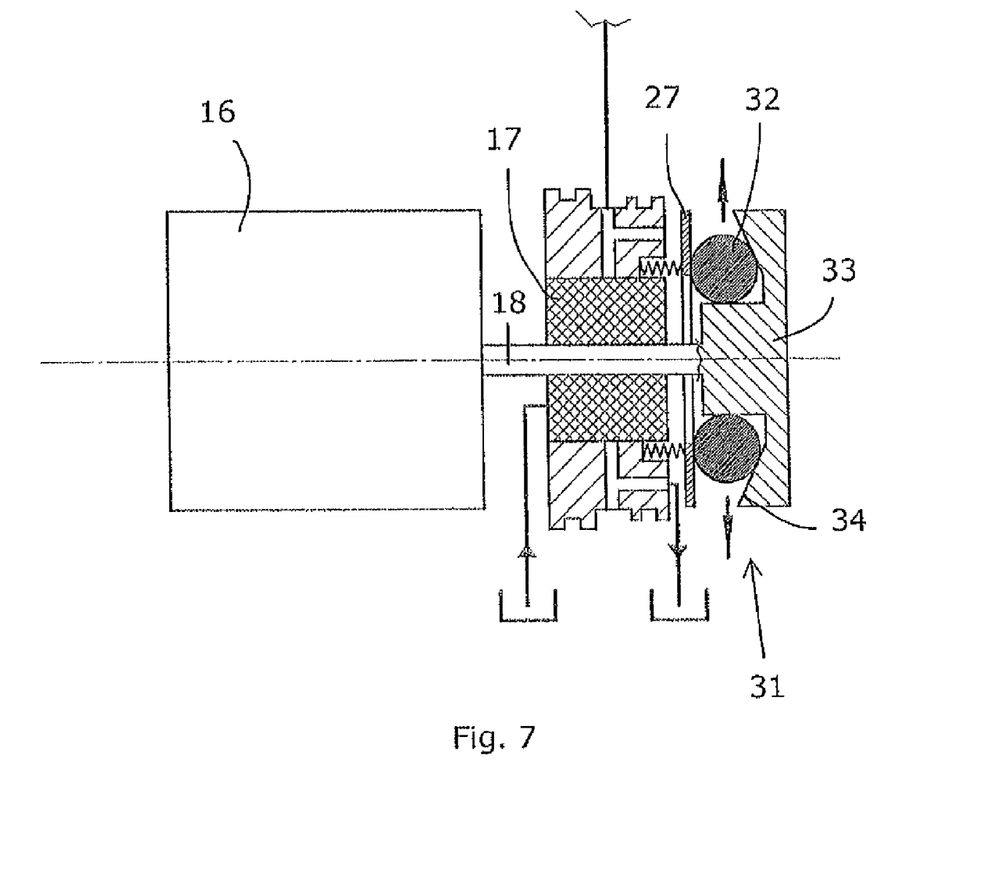
FIG. 7 is a schematic view of one alternative embodiment of a centrifugal regulator of the hydraulic actuator of FIG. 6.

An alternative embodiment of the centrifugal regulator is indicated in FIG. 7. In this embodiment the centrifugal regulator 31 comprises balls 32 arranged between the washer 27 of the pressure overflow valve and a ball support 33 on the drive shaft 18. The surface 34 of the ball support 33 in contact with the balls 32 is inclined. The inclination of the contact surface 34 of the ball support 33 is such that the distance between the contact surface 33 and the washer 27 decreases with the radial distance from the drive shaft 18.

Instead of connecting to the outlet port of the pump the pressure overflow valve could also be connected to each piston in a piston pump.

The function of the relief valve 19 is to get rid of air in the system in the assembly process, to have a second way to control maximum pressure in the system and have a chance to calibrate the system during its lifetime.

Figure 9:
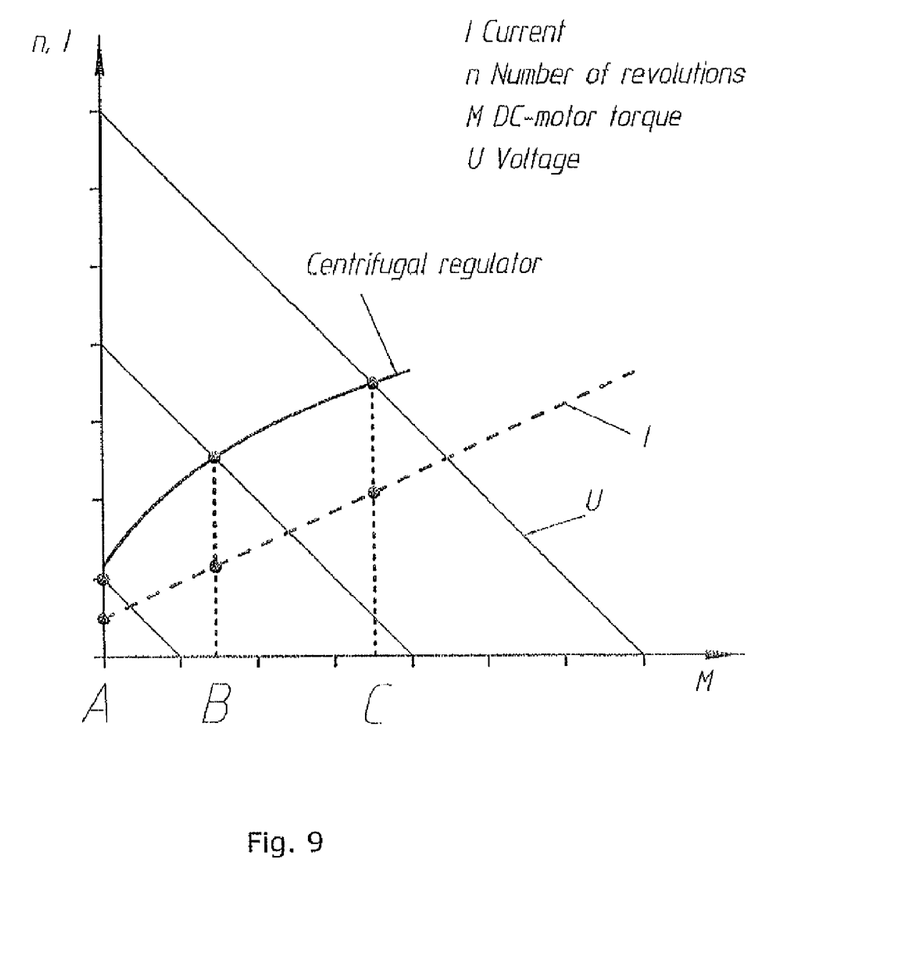
FIG. 9 is a diagram illustrating the relation between rotational speed, DC motor voltage and current of the hydraulic actuator of FIGS. 6 and 7.
Figure 11:
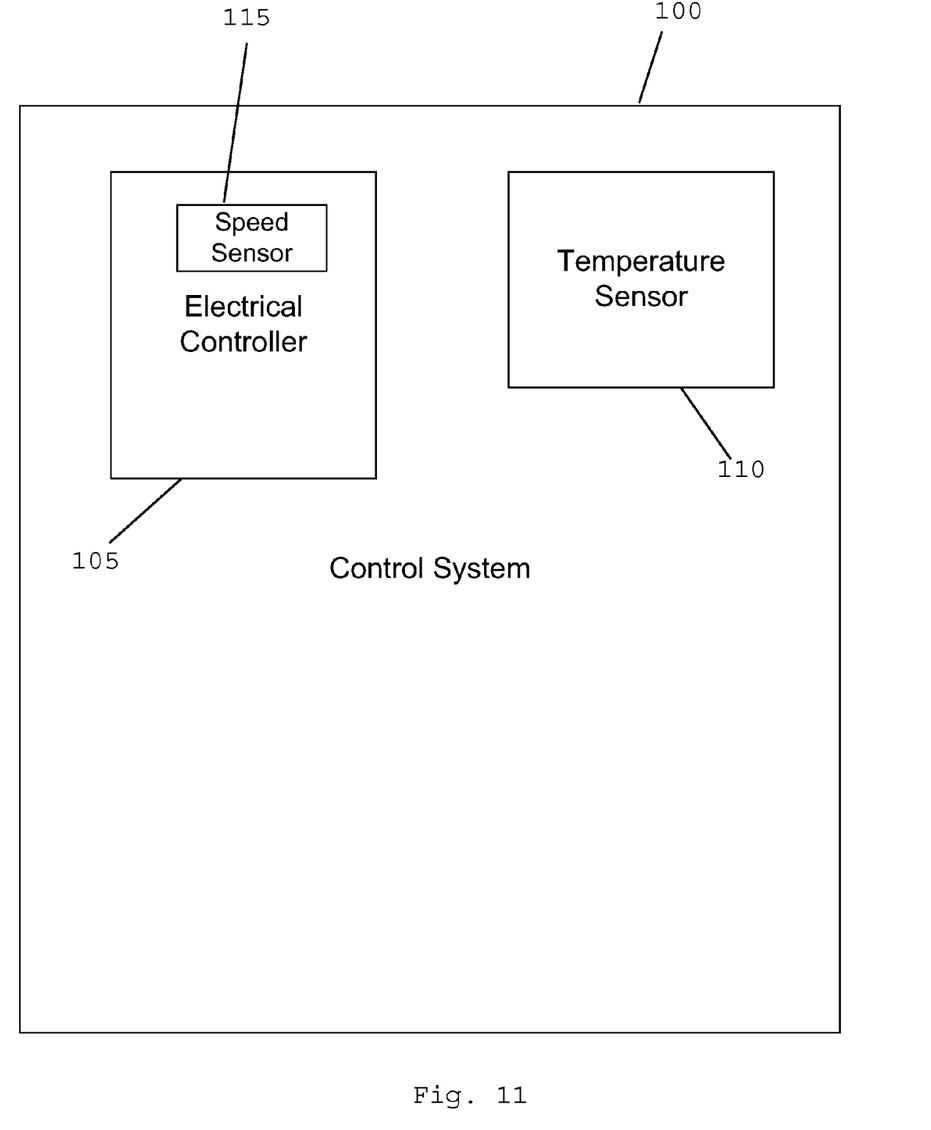
FIG. 11 is a schematic diagram of a control system.

The hydraulic pump 17 should be of a design having a good correlation between input torque to the pump 17 and pressure at a certain temperature. With an electrical controller 105 with a temperature sensor 110 integrated in the limited slip coupling 7 the control system 100 take care of changes between pressure/input pump torque and changes of current/DC-motor torque at different temperatures. In the preferred application the pressure is in principle controlled by current. The voltage to the DC motor 16 is regulated by means of the centrifugal regulator 23, see FIG. 9. In detailed regulation/controlling the controlling (putting set point) could be done with a combination of voltage and current, but the current to the DC motor 16 correlates with the value of the pressure in the system.

Another way of controlling the pressure in the system is to control the DC motor 16 speed using the information from the centrifugal regulator 23, see FIG. 8. It could be done by means of a more advanced electrical controller 105 (measure variation in current), with some type of extra speed sensor 115 or by using a brushless motor.

The DC motor 16 is always running when the vehicle drives. In open mode (ABS situation for example) of the clutch, the motor is running with a speed keeping the pressure overflow valve open, area A in FIG. 8, load point A in FIG. 9. When there is a demand for high torque in the clutch/pressure at the piston 13, a high current/voltage will go to the DC motor 16. The speed of the drive shaft 18 will go up, whereby the pressure overflow valve will be closed by means of the centrifugal regulator 23. When the desired pressure is reached the pressure overflow valve will open a bit in a first step into a balanced position (load point C in FIG. 9). If the pressure at the piston 13 is to go down to a lower level, the current/voltage is lowered and the overflow the valve opens more by means of the centrifugal regulator 23 in a first step and then closes to a balanced position at the desired pressure level (load point B in FIG. 9).

Compared to the prior art systems the opening time (go to ABS mode) will be shorter as the motor does not need to go down to zero, then reverse and open a quick open valve. The pressure will go down when the DC motor starts to decelerate.

Figure 10:
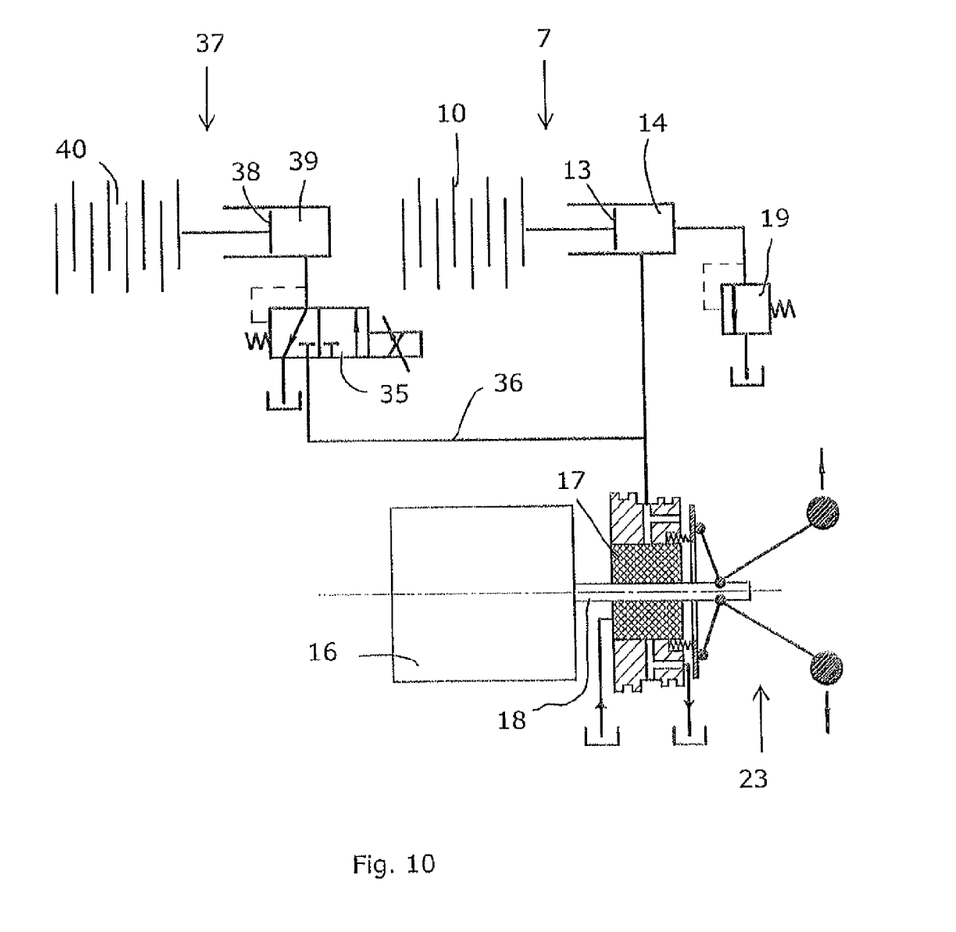
FIG. 10 is one example of a hydraulic actuator of the present invention comprising two limited slip couplings.

In FIG. 10 an example is shown where the pump coupling of the invention is used to control a further limited slip coupling 37 in addition to the limited slip coupling 7 of FIG. 6. The example of FIG. 10 may for instance be used in a drive system as exemplified in FIG. 2. Also the further limited slip coupling 37 comprises a piston 38, received in a cylinder chamber 39, and a disc package 40 on which the piston acts 38. A pressure reducing valve 35 is placed in a line 36 between the oil outlet 21 of the hydraulic pump 17 and the cylinder chamber 39 of the further limited slip coupling 37. The pressure reducing valve 35 will control at which pressure the piston 38 of the further limited slip coupling 37 will be activated.

What is claimed is:

1. A hydraulic actuator of a distribution system of torque between front and rear axles of an all wheel drive vehicle and/or distribution of torque between left and right wheels of a two or four wheel drive vehicle, which hydraulic actuator comprises an electric motor, a hydraulic pump, driven by means of a drive shaft of the electric motor, and one or more limited slip couplings, comprising a disc package and a piston acting on the disc package, which piston is actuated by means of the hydraulic pump, wherein a centrifugal regulator is connected to a rotating part of the electric motor or the hydraulic pump, which centrifugal regulator controls a pressure overflow valve, connected to the oil outlet of the hydraulic pump.

2. The hydraulic actuator of claim 1, wherein the rotating part is the drive shaft of the electric motor.

3. The hydraulic actuator of claim 1, wherein a relief valve is connected to the same side of the piston of the limited slip coupling as the hydraulic pump.

4. The hydraulic actuator of claim 3, wherein a pressure overflow valve is connected to a hydraulic piston pump.

5. The hydraulic actuator of claim 1, wherein the pressure overflow valve comprises a washer and spring arrangement, which washer doses off an overflow outlet in one position.

6. The hydraulic actuator of claim 5, wherein the centrifugal regulator comprises centrifugal levers acting directly on the washer of the pressure overflow valve and counteracting a spring or springs of the washer and spring arrangement.

7. The hydraulic actuator of claim 5, wherein the centrifugal regulator comprises balls arranged between the washer of the pressure overflow valve and a ball support on the drive shaft of the hydraulic pump and the surface of the ball support, in contact with the balls, is inclined.

8. The hydraulic actuator of claim 1, wherein the electric motor is a brush DC motor.

9. The hydraulic actuator of claim 1, wherein a control system comprises an electrical controller and a temperature sensor integrated in the limited slip coupling and wherein the hydraulic pressure is controlled by current to the electric motor.

10. The hydraulic actuator of claim 1, wherein an electrical controller measures variation in current to the electric motor, wherein a speed sensor is arranged sensing the speed of the drive shaft and/or wherein the electric motor is a brushless motor.

11. The hydraulic actuator of claim 1, wherein the electric motor is constantly running.

12. The hydraulic actuator of claim 1 wherein a pressure reducing valve is placed between the oil outlet of the hydraulic; pump and a further limited slip coupling, comprising a cylinder chamber, a piston, encompassed by the cylinder chamber, and a disc package.

13. A vehicle comprising a hydraulic; actuator according to claim 1.

* * * * *